United States Patent
Lu

(10) Patent No.: US 10,067,844 B2
(45) Date of Patent: Sep. 4, 2018

(54) METHOD OF CHANNEL CONTENT REBUILD IN ULTRA-HIGH CAPACITY SSD

(71) Applicant: NGD SYSTEMS, INC., Irvine, CA (US)

(72) Inventor: Guangming Lu, Irvine, CA (US)

(73) Assignee: NGD Systems, Inc., Irvine, CA (US)

( * ) Notice: Subject to any disclaimer, the term of this patent is extended or adjusted under 35 U.S.C. 154(b) by 179 days.

(21) Appl. No.: 15/194,527

(22) Filed: Jun. 27, 2016

(65) Prior Publication Data

US 2016/0306723 A1  Oct. 20, 2016

Related U.S. Application Data

(63) Continuation-in-part of application No. 14/741,929, filed on Jun. 17, 2015.

(60) Provisional application No. 62/013,937, filed on Jun. 18, 2014.

(51) Int. Cl.
*G06F 11/10* (2006.01)
*G06F 11/20* (2006.01)
*G06F 11/30* (2006.01)

(52) U.S. Cl.
CPC ........ *G06F 11/2094* (2013.01); *G06F 11/108* (2013.01); *G06F 11/1092* (2013.01); *G06F 11/3037* (2013.01); *G06F 11/3055* (2013.01); *G06F 2201/86* (2013.01)

(58) Field of Classification Search
CPC ............ G06F 11/1092; G06F 11/1084; G06F 11/2056; G06F 11/2094
See application file for complete search history.

(56) References Cited

U.S. PATENT DOCUMENTS

| | | | | |
|---|---|---|---|---|
| 9,715,436 B2* | 7/2017 | Karrotu | ............... | G06F 11/2094 |
| 9,858,084 B2* | 1/2018 | Manlapat | .............. | G06F 9/4401 |
| 9,875,205 B1* | 1/2018 | Bruce | ................. | G06F 13/4031 |
| 2008/0109647 A1* | 5/2008 | Gavens | ..................... | G06F 8/65 |
| | | | | 713/2 |
| 2008/0109798 A1* | 5/2008 | Gavens | ..................... | G06F 8/65 |
| | | | | 717/168 |
| 2015/0370670 A1* | 12/2015 | Lu | ....................... | G06F 11/2094 |
| | | | | 714/6.32 |

* cited by examiner

*Primary Examiner* — Yolanda L Wilson
(74) *Attorney, Agent, or Firm* — Lewis Roca Rothgerber Christie LLP

(57) ABSTRACT

A method of restoring user data in a modular solid-state drive including memory channels coupled to respective ones of non-volatile memory cards, the method including: upon physical replacement of a defunct memory card of the non-volatile memory cards with a new non-volatile memory card, and power on of the modular solid-state drive, retrieving a firmware segment and a system segment of the modular solid-state drive from unaffected memory channels of the memory channels not coupled to the new non-volatile memory card; rebuilding a firmware of the modular solid-state drive based on the retrieved firmware segment; rebuilding a data mapping table associated with the non-volatile memory cards based on the retrieved system segment; and restoring full integrity of the user data originally stored on the non-volatile memory cards based on the rebuilt data mapping table and data from the unaffected memory channels.

20 Claims, 6 Drawing Sheets

| | | | | | | | | | |
|---|---|---|---|---|---|---|---|---|---|
| Flash Die Capacity (GB) | 32 | | | | | | | | |
| Channel Num. | 16 | | | | | | | | |
| Tprog(ms) | 2.4 | | | | | | | | |
| Flash Page Size(B) | 18256 | | | | | | | | |
| Flash Channel Max speed(MB/s) | 400 | | | | | | | | |
| Program Command Extra Cycles | 10 | | | | | | | | |
| ECC Aggregated throughput (GB/s) | 4 | | | | | | | | |
| Dies/Channel | | 8 | | 16 | | 32 | | 64 | |
| SSD Capacity (TB) | | 4 | | 8 | | 16 | | 32 | |
| | NAND Plane# | effective max write /CH (MB/s) | Rebuild time (hrs) | effective max write /CH (MB/s) | Rebuild time (hrs) | effective max write /CH (MB/s) | Rebuild time (hrs) | effective max write /CH (MB/s) | Rebuild time (hrs) |
| | 1 | 61 | 1.2 | 122 | 1.2 | 191 | 1.5 | 191 | 3 |
| | 2 | 122 | 0.6 | 243 | 0.6 | 258 | 1.1 | 258 | 2.3 |
| | 4 | 243 | 0.3 | 314 | 0.5 | 314 | 1.1 | 314 | 2.1 |

FIG. 5

METHOD OF CHANNEL CONTENT REBUILD IN ULTRA-HIGH CAPACITY SSD

CROSS-REFERENCE TO RELATED APPLICATION(S)

The present application is a continuation in part of U.S. patent application Ser. No. 14/741,929, filed Jun. 17, 2015, entitled "METHOD OF CHANNEL CONTENT REBUILD VIA RAID IN ULTRA HIGH CAPACITY SSD", which claims priority to and the benefit of U.S. Provisional Application No. 62/013,937, filed Jun. 18, 2014, entitled "METHOD OF CHANNEL CONTENT REBUILD VIA RAID IN ULTRA HIGH CAPACITY SSD", the entire contents of all the above cross-referenced application being incorporated herein by reference.

The present application is also related to U.S. patent application Ser. No. 14/741,921, filed Jun. 17, 2015, entitled "ULTRA HIGH CAPACITY SSD", the entire content of which is incorporated herein by reference.

FIELD

Aspects of the present invention relate to a system and method for channel content rebuild in a storage system.

BACKGROUND

Enterprises and cloud service providers continue to experience dramatic growth in the amount of data stored in private and public clouds. As a result, data storage costs are rising rapidly because a single high-performance storage tier is often used for all cloud data. However, much of the ever-increasing volume of information is "cold data," that is, data that is infrequently accessed. There's considerable potential to reduce cloud costs by moving this data to a lower-cost cold storage tier. As a result, cold storage is emerging as a significant trend.

Cold storage usage models include backup, disaster recovery, archiving, and social media applications. The following four interrelated parameters are relevant to most cold storage usage models:

1) Expected storage life: cold storage is designed for persistent rather than transient data and is used as long-term storage for data that is considered important enough to retain.

2) Access frequency: as data ages, it tends to be less frequently accessed and therefore becomes more suited to cold storage. Data may be moved to cold storage based on the date and time it was last accessed.

3) Access speed: cold storage explicitly assumes that lower performance is acceptable for older data.

4) Cost: The benefit of cold storage is the reduced cost of storing older and less frequently accessed data.

As in other types of storage, cold storage is susceptible to memory failure, however, given the large size of cold storage, maintaining a full backup of the cold data may be prohibitively expensive and the process of repairing a cold storage drive may require sophisticated equipment that is generally not available at the site of the storage device. As such the Ultra-High Capacity Solid-State Drive (UHC SSD) is an appealing solution for many data centers and some users of traditional Hard-Disk Drive solution. As compared to alternative solutions, the UHC SSD may have lower maintenance cost, less power consumption, and consume less area.

The above information disclosed in this Background section is only for enhancement of understanding of the background of the invention, and therefore it may contain information that does not form the prior art that is already known to a person of ordinary skill in the art.

SUMMARY

Aspects of embodiments of the present invention are directed to a modular solid-state drive including a plurality of modular non-volatile memory cards and capable of self-recovery and rebuild (e.g., self-rebuilding without the aid of other equipment) of stored data upon replacement of a failing one of the modular non-volatile memory packages with a new (e.g., blank) modular non-volatile memory package.

Aspects of embodiments of the present invention are directed to a method of rebuilding stored data upon field replacement of a failing or defunct non-volatile memory card (e.g., a failing memory channel) in a modular solid-state drive without the aid of other equipment.

According to some embodiments of the present invention, there is provided a method of restoring user data in a modular solid-state drive including a plurality of memory channels coupled to respective ones of a plurality of non-volatile memory cards, the method including: upon physical replacement of a defunct memory card of the plurality of non-volatile memory cards with a new non-volatile memory card, and power on of the modular solid-state drive, retrieving a firmware segment and a system segment of the modular solid-state drive from unaffected memory channels of the plurality of memory channels not coupled to the new non-volatile memory card; rebuilding a firmware of the modular solid-state drive based on the retrieved firmware segment; rebuilding a data mapping table associated with the plurality of non-volatile memory cards based on the retrieved system segment; and restoring full integrity of the user data originally stored on the plurality of non-volatile memory cards based on the rebuilt data mapping table and data from the unaffected memory channels.

In an embodiment, the method further includes: identifying failure of the defunct memory card; and reporting the identified defunct memory card to a user of the modular solid-state drive to prompt physical replacement of the defunct memory card with the new non-volatile memory card.

In an embodiment, the retrieving of the firmware segment and the system segment from the memory channels includes: retrieving the firmware segment from a first subset of the memory channels not coupled to the new non-volatile memory card, and retrieving the system segment from a second segment of the memory channels not coupled to the new non-volatile memory card.

In an embodiment, the plurality of non-volatile memory cards are configured to store a plurality of copies of the firmware segment and the system segment, wherein each complete copy of the firmware segment only resides at a first subset of the plurality of non-volatile memory cards, and each complete copy of the system segment only resides at a second subset of the plurality of non-volatile memory cards, and wherein the user data is stored as page stripes distributed across the plurality of non-volatile memory cards.

In an embodiment, the plurality of non-volatile memory cards maintain at least a complete copy of the plurality of copies of the firmware and system segments even when the defunct memory card is replaced.

In an embodiment, the method further includes: copying the retrieved firmware segment or only a firmware missing portion of the retrieved firmware segment onto a first subset of the plurality of memory channels coupled to the new non-volatile memory card; and copying the retrieved system segment or only a system missing portion of the retrieved system segment onto a second subset of the plurality of memory channels coupled to the new non-volatile memory card, wherein the firmware missing portion and the system missing portion represent corresponding firmware and system data stored on the replaced defunct memory card.

In an embodiment, the restoring of the full integrity of the user data includes: retrieving unaffected portions of the user data from the unaffected memory channels one page stripe at a time; processing the unaffected portions of the user data including a corresponding parity to determine a missing portion of the user data stored on the replaced defunct memory card; and programming the missing portion of the user data to the new non-volatile memory card.

In an embodiment, the method further includes: continuing to service host data requests while restoring the full integrity of the user data originally stored on the plurality of non-volatile memory cards.

In an embodiment, the firmware segment includes data identifying a configuration of each of the plurality of non-volatile memory cards and utilized for controlling internal operations of the plurality of non-volatile memory cards.

In an embodiment, the system segment includes a logical-to-physical table mapping logical block addresses of a host to physical memory addresses of the plurality of non-volatile memory cards and a physical-to-logical table mapping physical memory addresses of the plurality of non-volatile memory cards to logical block addresses of a host, and the host is in communication with the modular solid-state drive.

In an embodiment, each of the plurality of non-volatile memory cards includes a plurality of non-volatile memory dice.

In an embodiment, the plurality of non-volatile memory cards are electrically and mechanically coupled to the plurality of memory channels via a plurality of mating connectors at a controller board of the modular solid-state drive, and the plurality of non-volatile memory cards are configured to be plugged into and unplugged from the plurality of mating connectors.

According to some embodiments of the present invention, there is provided a modular solid-state drive capable of restoring user data after channel failure, the modular solid-state drive including: a plurality of non-volatile memory cards; a plurality of memory channels coupled to respective ones of the plurality of non-volatile memory cards; a processor; and a processor memory local to the processor, wherein the processor memory has stored thereon instructions that, when executed by the processor, cause the processor to perform: upon physical replacement of a defunct memory card of the plurality of non-volatile memory cards with a new non-volatile memory card, and power on of the modular solid-state drive, retrieving a firmware segment and a system segment of the modular solid-state drive from unaffected memory channels of the plurality of memory channels not coupled to the new non-volatile memory card; rebuilding a firmware of the modular solid-state drive based on the retrieved firmware segment; rebuilding a data mapping table associated with the plurality of non-volatile memory cards based on the retrieved system segment; and restoring full integrity of the user data originally stored on the plurality of non-volatile memory cards based on the rebuilt data mapping table and data from the unaffected memory channels.

In an embodiment, the retrieving of the firmware segment and the system segment from the memory channels includes: retrieving the firmware segment from a first subset of the memory channels not coupled to the new non-volatile memory card, and retrieving the system segment from a second segment of the memory channels not coupled to the new non-volatile memory card.

In an embodiment, the plurality of non-volatile memory cards are configured to store a plurality of copies of the firmware segment and the system segment, wherein each complete copy of the firmware segment only resides at a first subset of the plurality of non-volatile memory cards, and each complete copy of the system segment only resides at a second subset of the plurality of non-volatile memory cards, wherein the plurality of non-volatile memory cards maintain at least a complete copy of the plurality of copies of the firmware and system segments even when the defunct memory card is replaced, and wherein the user data is stored as page stripes distributed across the plurality of non-volatile memory cards.

In an embodiment, the instructions further cause the processor to perform: copying the retrieved firmware segment onto a first subset of the plurality of memory channels coupled to the new non-volatile memory card; and copying the retrieved system segment onto a second subset of the plurality of memory channels coupled to the new non-volatile memory card, wherein the first and second subset of channels have at least one overlapping channel.

In an embodiment, the restoring of the full integrity of the user data includes: retrieving unaffected portions of the user data from the unaffected memory channels one page stripe at a time; comparing the unaffected portions of the user data against a corresponding parity to determine a missing portion of the user data stored on the replaced defunct memory card; and programming the missing portion of the user data to the new non-volatile memory card.

In an embodiment, the firmware segment includes data identifying a configuration of each of the plurality of non-volatile memory cards and utilized for controlling internal operations of the plurality of non-volatile memory cards.

In an embodiment, the system segment includes a logical-to-physical table mapping logical block addresses of a host to physical memory addresses of the plurality of non-volatile memory cards, and the host is in communication with the modular solid-state drive.

In an embodiment, the plurality of non-volatile memory cards are electrically and mechanically coupled to the plurality of memory channels via a plurality of mating connectors at a controller board of the modular solid-state drive, and wherein the plurality of non-volatile memory cards are configured to be plugged into and unplugged from the plurality of mating connectors.

BRIEF DESCRIPTION OF THE DRAWINGS

The accompanying drawings, together with the specification, illustrate example embodiments of the present invention, and, together with the description, serve to explain the principles of the present invention.

FIG. 5 is a table tabulating the SSD rebuild time of the solid-state drive using an XOR RAID approach, according to some example embodiments of the present invention.

DETAILED DESCRIPTION

Figure 1:
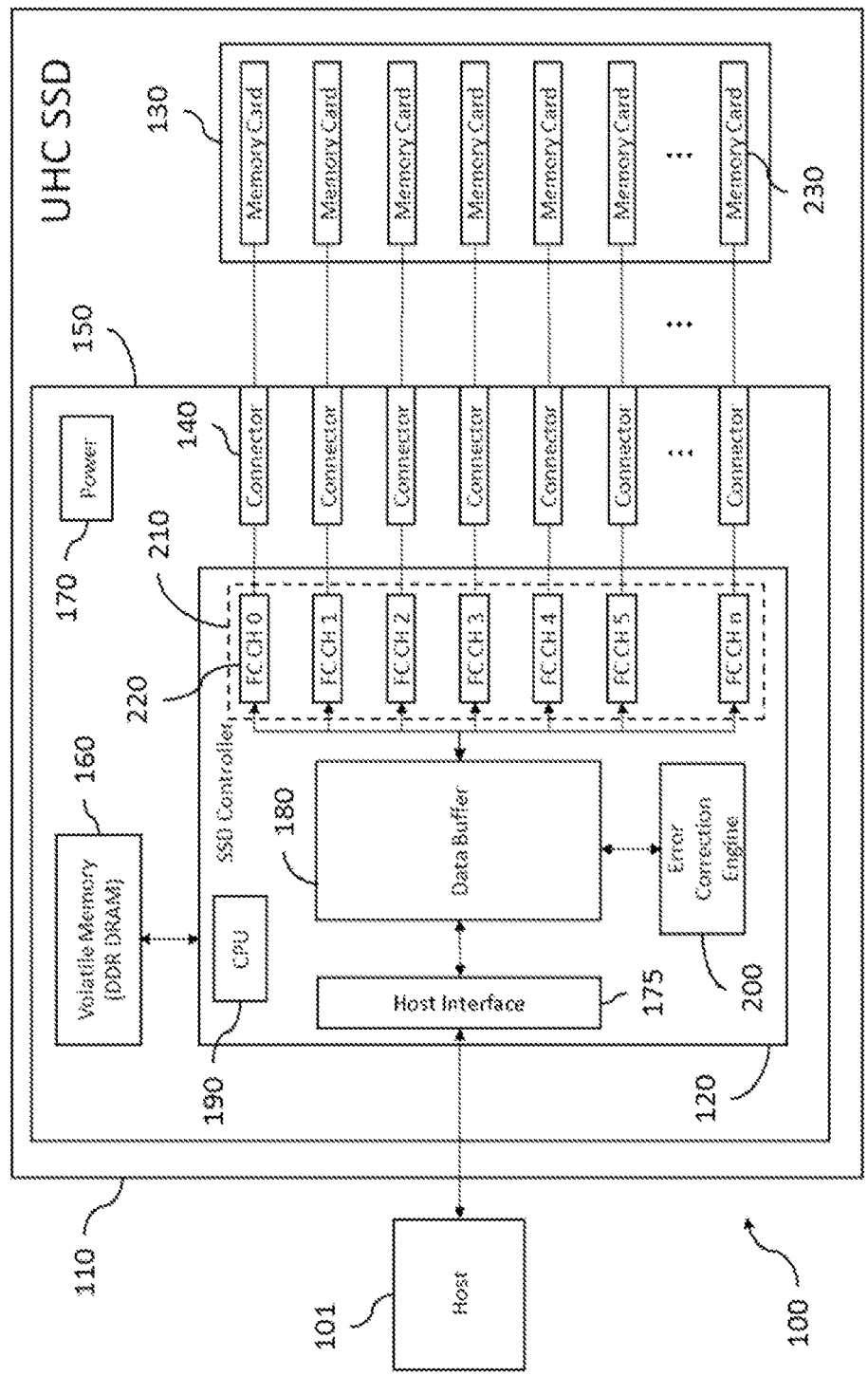
FIG. 1 is a block diagram illustrating a data system in which a host is in communication with a solid-state drive, according to some example embodiments of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

FIG. 1 is a block diagram illustrating a data system 100 in which a host 101 is in communication with a solid-state drive 110, according to some example embodiments of the present invention. As used herein, the phrase "in communication with" refers to being in direct communication with, or being in indirect communication with, via one or more components named or unnamed herein.

Referring to FIG. 1, the host 101 (e.g., a server or other computer) and the solid-state drive (SSD) 110 can be in communication with each other via a wired or wireless connection. For example, in an embodiment, the SSD 110 may include a connector having pins (or a socket) to mate with a corresponding socket (or pins) on the host 101 to establish an electrical and physical connection. In another embodiment, the SSD 110 can include a wireless transceiver to place the host 101 and the SSD 110 in wireless communication with each other. The host 101 and the SSD 110 may be separately housed from each other, or contained in the same housing. The solid-state drive 110 may provide storage for the host 101. An interface (including, e.g., a host connector and the communications protocols) between the solid-state drive 110 and the host 101 may be, for example, a storage interface such as Serial Advanced Technology Attachment (SATA), Fiber Channel, Small Computer System Interface (SCSI), Serial Attached SCSI (SAS), Peripheral Component Interconnect Express (PCIe), Non Volatile Memory Express (NVMe), SCSI over PCIe, or a more general-purpose interface such as Ethernet or Universal Serial Bus (USB).

According to some embodiments the SSD (e.g., an ultra-high capacity (UHC) SSD) 110 includes a solid-state drive controller (SSD controller) 120 and a modular array of memory cards (e.g., non-volatile/flash memory cards) 130, each connected via a first mating connector 140 (e.g., a disconnectable, detachable, or pluggable/unpluggable connector, such as an M.2 connector, formerly referred to as a Next Generation Form Factor (NGFF) connector) to a controller board 150, on which is installed the SSD controller 120. The SSD controller 120 is a processing circuit, i.e., a circuit configured to process data or digital signals, which facilitates the transfer of data to and from the modular array of memory cards 130. The controller board 150 may also include volatile memory (e.g., dynamic random access memory (DRAM)) 160 and a power unit 170 for providing power to the various components of the SSD 110.

In some embodiments, the SSD controller 120 includes a host interface 175 for interfacing with the host 101, a data buffer 180 that acts as an intermediary between the host 101 and the array of memory cards 130, a controller processor (e.g., a CPU) 190 for managing the operations of the SSD controller 120 (such as execution of read, write, and garbage collection operations), and an error correction and RAID (redundant array of independent disks) engine 200 for encoding and decoding codewords (e.g., data streams), scrambling data and the like. In some embodiments, the ECC engine 200 may include a low-density parity check (LDPC) encoder and decoder, an exclusive or (XOR) engine for RAID 4 or RAID 5, and/or the like. The SSD controller 120 further includes a channel controller 210 having one or more bi-directional channels (e.g., flash channels) 220 acting as conduits for transferring data to and from the modular array of memory cards 130. Each channel 220 may correspond to (e.g., be coupled to) a corresponding memory card (e.g., a solid-state/flash memory card) 230 of the array of memory cards 130. Having a number of channels 220 enables parallel processing of the write and read commands by the SSD controller 120 as, for example, at any given time, one channel 220 may be writing to one memory card 230, while another channel 220 may be reading from a different memory card 230.

From a manufacturing point of view, the controller board 150 and the memory cards 230 are fabricated and tested separately. Unlike non-modular SSDs, a single memory card 230 failure may not cause the failure of entire SSD 110. Meanwhile, from SSD usage point of view, according to some embodiments, each of the memory cards 230 in the modular array of memory cards 130 is field-replaceable, in the event of a failure, as will be described in further detail below. This modular design of the solid-state drive 110 provides many practical benefits and offers cost savings.

In a related art SSD (i.e., no-modular SSD) with RAID functionality, if some memory (e.g., non-volatile memory/flash) blocks/dice/packages become bad, the SSD may remain functional via RAID rebuild, if access to bad/failed blocks/dice/packages happens. However, RAID recovery is slow in throughput and consumes significant power. In the non-modular SSD flash channel design, typically after RAID recovery, bad blocks/dice may be retired through the use of the garbage collection function with the shrinking of either SSD capacity or through over-provisioning. However, in cold storage applications, rewrite operations rarely occur. As such, over-provision is provided as little as possible. If the bad blocks/dice/package remains after the over-provision is used up, the host will have much lower throughput than expected (from its design specification) once a read operation from the bad region occurs.

The solid-state drive 110, according to embodiments of present invention, resolves this issue by utilizing a modular memory channel design, whereby it is possible to replace a bad memory channel (i.e., a memory card 130 having failing/bad blocks/dice), at the site of the solid-state drive 110 and without the aid of other equipment, while maintaining the capacity of the solid-state drive 110. The firmware of the solid-state drive 110 further maintains data integrity upon replacement of a memory channel (i.e., a memory card 130).

Figure 2:
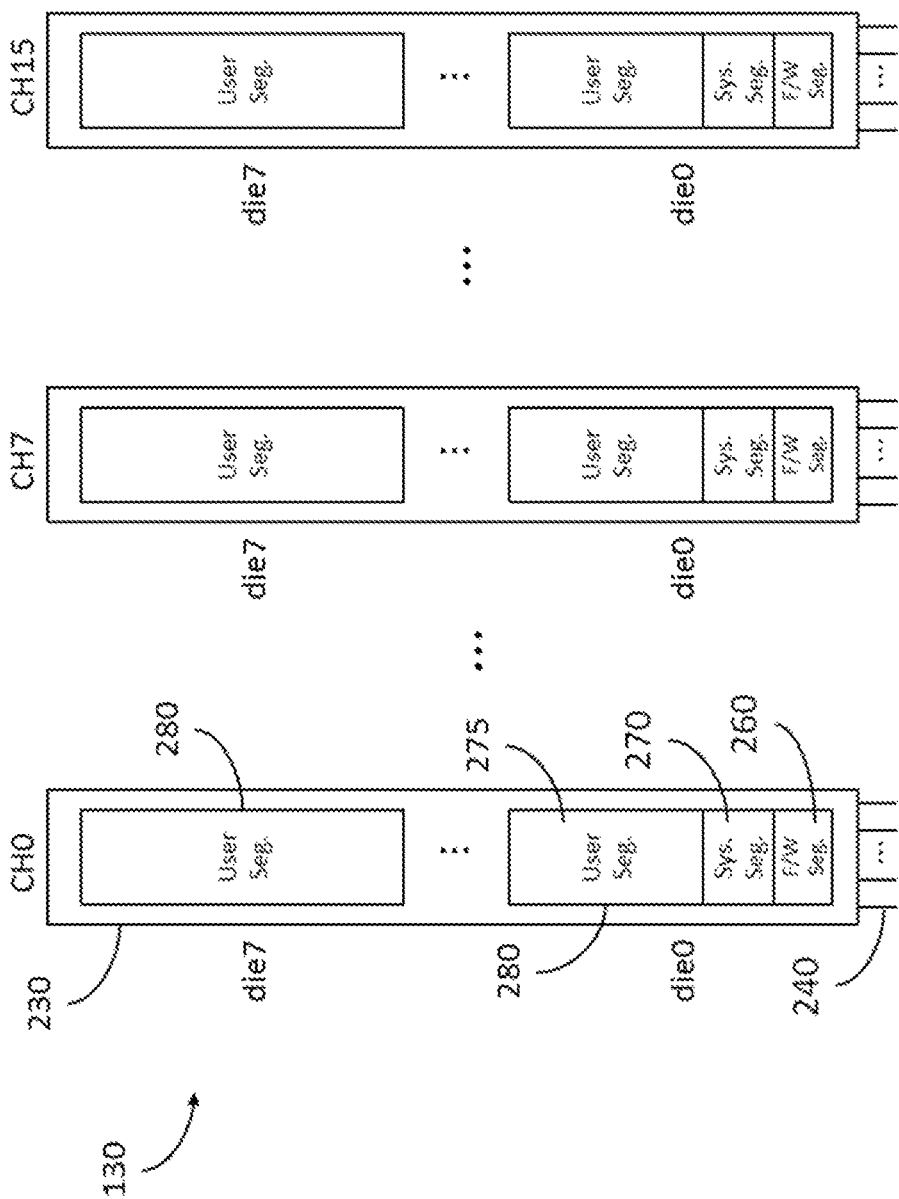
FIG. 2 is a block diagram of a modular array of memory cards, according to some example embodiments of the present invention.

FIG. 2 is a block diagram of the modular array of memory cards 130, according to some example embodiments of the present invention.

Referring to FIG. 2, in some embodiments, each memory card 230 is coupled with, and may be supported at one end by, a second mating connector 240 (e.g., a card-edge socket or M.2 connector, where only physical form factor, power/ground pins follow the M.2 specification) configured to detachably mate with the first mating connector 140 of the SSD controller 120. That is the first and second mating connectors 140 and 240 are configured to match one another and to readily plug into or unplug from one another. In some examples, a flash interface protocol, such as Open NAND Flash Interface (ONFI), Toggle, or the like may run over the first and second mating connectors 140 and 240, which may be M.2 connectors, respectively. In some examples, the mating connectors 140 and 240 may have electrical pin outs that are different from those of the M.2 standard. This configuration ensures that the memory card 230 can be manufactured and tested separately from the rest of the components of the solid-state drive 110, which enables the solid-state drive 110 to achieve field reparability.

Each memory card 230 may include a plurality of flash memory packages and each package may include a plurality of memory dice 280 (e.g., die 0 to die 7 shown in FIG. 2) of suitable memory technology. For instance, the storage medium used in some embodiments may be current and next generation flash devices compliant with the Open NAND Flash Interface (ONFI) and Toggle interface standards or other similar or future non-volatile memory (NVM) technology. The devices may be high density, block addressable and erasable elements suitable for block storage applications.

In some examples, the SSD controller 120 may include 16 channels (e.g., CH0, CH1 . . . CH15) corresponding to 16 memory cards 230 (as, e.g., illustrated in FIG. 2), each of which may have a storage capacity of about 2 TBs (terabytes), making the solid-state drive 110 a 32 TB drive. However, embodiments of the present invention are not limited thereto, and the SSD 110 may have any suitable number of channels and corresponding memory cards that may be less than or greater than 16. Further, the memory cards 230 may have any suitable data capacity less than or greater than 2 TB.

The storage space of the SSD 110 may be divided into three logical segments: firmware segment 260, system map and information segment 270, and user data segment 275. The firmware segment 260 is used to store the SSD firmware, which, among other functions, may be utilized to perform: communication protocol handling with the host 101; queuing, interpretation, and dispatch of commands from host 101; creation/rebuild/translation from a logical address to a physical address (channel, die, block, page, byte offset) and vice versa; handling flash translation layer (FTL) protocol; controlling the ECC engine 200; creating log information, and/or the like. The system map and information segment 270 is used to store the memory management information (e.g., NAND flash information), for instance the logical-to-physical mapping table, physical-to-logic mapping table, memory block (e.g., NAND block) information, and other internal information generated by the SSD firmware in order to facilitate management of SSD 110, and/or the like. System segment 270 can be centralized vertically (as, e.g., shown in FIG. 2) by reserving certain blocks for system management data in each memory channel, or may be distributed across all blocks. The firmware and system segments 260 and 270 generally only occupy a small percentage of the total capacity of the SSD 110 as compared to the user data segment 275. The data of both the firmware segment 260 and the system segment 270 are distributed across all of the memory cards 230 (e.g., from channel 0 to 15 as shown in FIG. 2).

Because every single memory card 230 contains the partial information of firmware segment 260 and the system segment 270, under a related art firmware and system segment layout, once a memory card 230 that has failed (e.g., that contains one or more bad/failed pages/blocks/dice) is replaced by a new one, all of the information in the failed/defunct flash memory card is lost. Moreover, due to lack of critical flash management information that is distributed among the memory cards 230, it may not be possible to copy data error-free from the swapped-out (bad) memory card 230 to the new swapped-in memory card 230 using external equipment. In particular, when variable error correction code rate method is employed in the SSD 110, different blocks/dice of the memory cards 230 may employ different code rate. Although, it may be possible to copy data directly from the old flash memory card 230 to the new card at the cost of error propagation without passing through the ECC engine 200.

According to embodiments of the present invention, the SSD 110 is capable of being field-repairable by maintaining multiple copies of the firmware segment 260 and system segment 270 across the memory cards 230 of the array 130.

Figure 3:
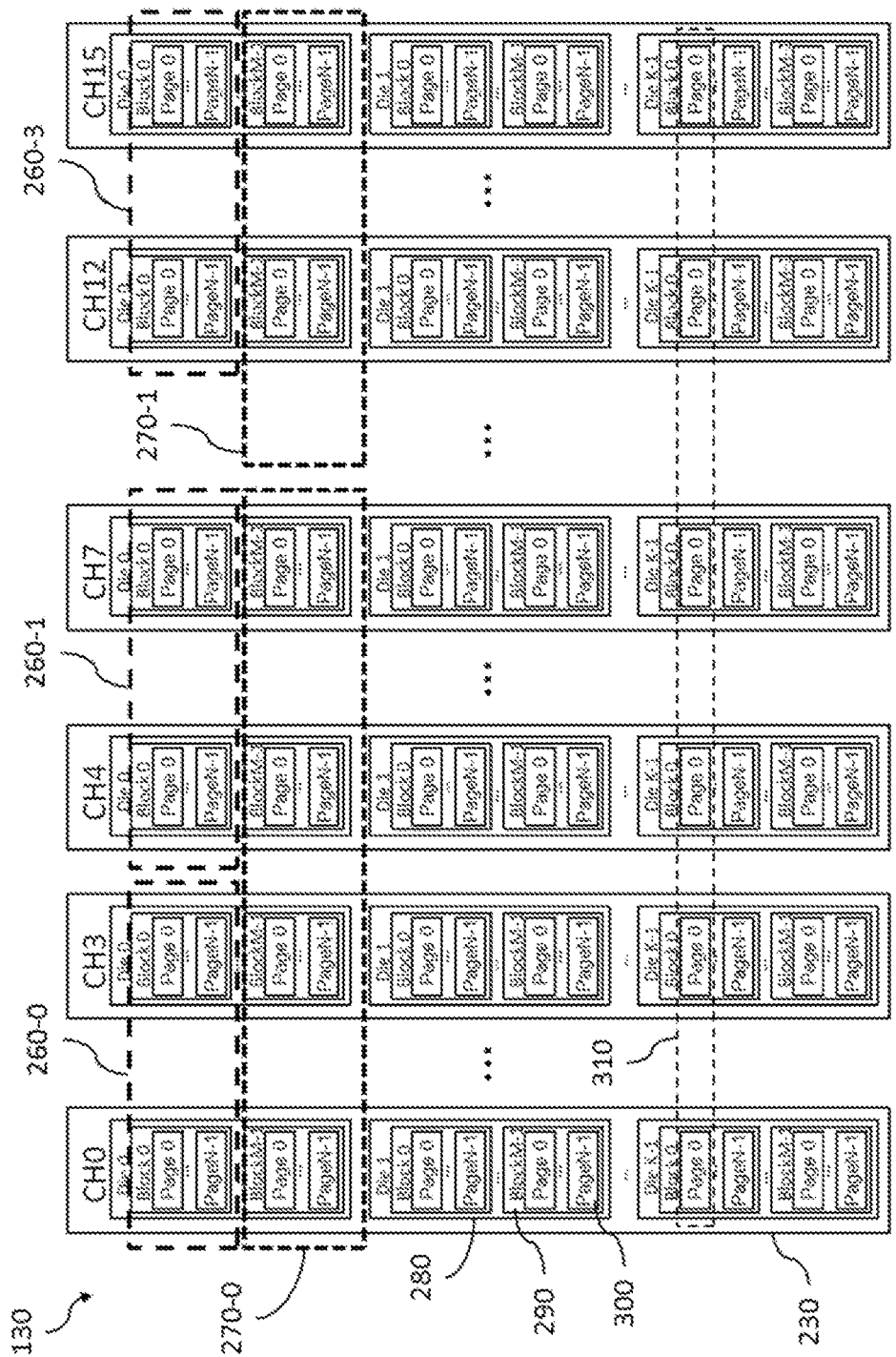
FIG. 3 is a block diagram illustrating the modular array of the memory cards storing multiple copies of the firmware and systems segments, according to some example embodiments of the present invention.

FIG. 3 is a block diagram illustrating the modular array of the memory cards 130 storing multiple copies of the firmware and systems segments 260 and 270, according to some example embodiments of the present invention. For ease of illustration, FIG. 3 shows 16 channels and memory cards; however, embodiments of the present invention are not limited thereto.

Referring to FIG. 3, each memory card 230 (also referred to as a memory channel) has a plurality of memory dice 280 (e.g., K dice where K is an integer greater than 1). Each die 280 includes a plurality of memory blocks 290, each of which includes a plurality of pages 300. The pages 300 in the same logical location in each memory channel make up a page stripe 310. Thus, no two pages 300 in the same channel are allowed to be located in the same page stripe. Each block 290 may include one or more planes (e.g., two or four planes), which maybe written to contiguously. Multiple plane programming may provide a boost to data programming (data writing) throughput. User data may be written to the memory cards 230 along a page stripe and thus, a continuous piece of user data is distributed across different memory cards 230 (i.e., different memory channels).

According to some embodiments, the modular array of memory cards 130 stores multiple copies of the firmware segment 260 in different channel subgroups of channels for redundancy. As the firmware segment 260 is typically very small relative to the SSD capacity (e.g., in the order of several GBs or less), storing multiple copies of the firmware segment may not meaningfully affect available data capacity.

According to some embodiments, in order to support the field-repairable capability, no copy of the firmware segment 260 crosses all channels (e.g., all memory cards 230), and each copy only occupies a subset of channels (e.g., a subset of memory cards 230). As shown in FIG. 3, in some examples, the modular array of memory cards 130 may store four (4) copies of the firmware segment 260, such that channels 0-3 store a whole copy 260-0 of the firmware segment 260, while channels 4-7, channels 8-11, and channels 12-15 store further copies 260-1, 260-2, and 260-3, respectively, of the complete firmware segment 260 for redundancy.

As the firmware segment 260 is almost static, very few writes are performed on the firmware segment after fabrication. At any given time, only a first copy of firmware segment 260 may be active. If any write operation occurs at a first copy (the active copy) of the firmware segment 260, the SSD controller 120 may perform the same write operation on other (non-active) copies of the firmware segment 260 to ensure that all copies are in the same state. The SSD controller 120 may update the non-active copies of the firmware segment according to a first schedule, which may be predefined.

Referring still to FIG. 3, according to some embodiments, the modular array of memory cards 130 also store multiple copies of the system segment 270 in different channel subgroups for redundancy. Similar to the firmware segment 260, the system segment 270 may also be small relative to total SSD capacity, although the system segment 270 may be much larger than the firmware segment. For example, the system segment size may be about 1 GB for each 1 TB of user data. Thus, in a 32 TB configuration, the system segment 270 may be about 32 GB in size.

To further support field-repairable capability, the multiple copies of the system segment 270 are stored in different flash channels. For example, as shown in FIG. 3, channels 0-7 may store a whole copy 270-0 (e.g., an active copy) of the system segment 270, while channels 8-15 store another (non-active) identical copy 270-1 of the complete system segment 270 for redundancy. Thus, whenever there is a write to copy 270-0, the same data is written to copy 270-1. Further, if some block stripes in channels 0-7 containing copy 270-0 are garbage-collected and erased, the same block stripes in channel 8-15 that contain copy 270-1 are erased as well. The SSD controller 120 may update the non-active copies of the system segment 270 according to a second schedule, which may be predefined. In some embodiments, the first and second schedules may be the same, that is, the non-active copies of the firmware and system segments 260 and 270 may be concurrently updated (e.g., updated at the same time); however, embodiments of the present invention are not limited thereto, and the first and second schedules may be different, that is, the non-active copies of the firmware and system segments 260 and 270 may be updated at different times.

While, unlike the firmware segment 260, the system segment 270 updates/erases data consistently if new user data is written into the SSD 110, this occurs only infrequently in cold storage applications.

Thus, according to some embodiments of the present invention, the complete firmware segment 260 and the system segment 270 are still available in the SSD 110 even when one memory card 230 (e.g., one flash channel) is replaced, as no copy of either the firmware segment 260 or the system segment 270 is written across all of the memory channels.

While maintaining redundant copies of the firmware and system segments 260 and 270 may not significantly affect the available storage capacity of the SSD 110, such an approach to backing up and restoring user data may be prohibitively expensive. As such, embodiments of the present invention utilize a data storage virtualization technology, such as a redundant array of independent disks (RAID), as a mechanism of self-rebuilding (e.g., automated restoring) user data that may otherwise be lost as a result of a memory card 230 (e.g., a flash channel) being replaced.

Figure 4:
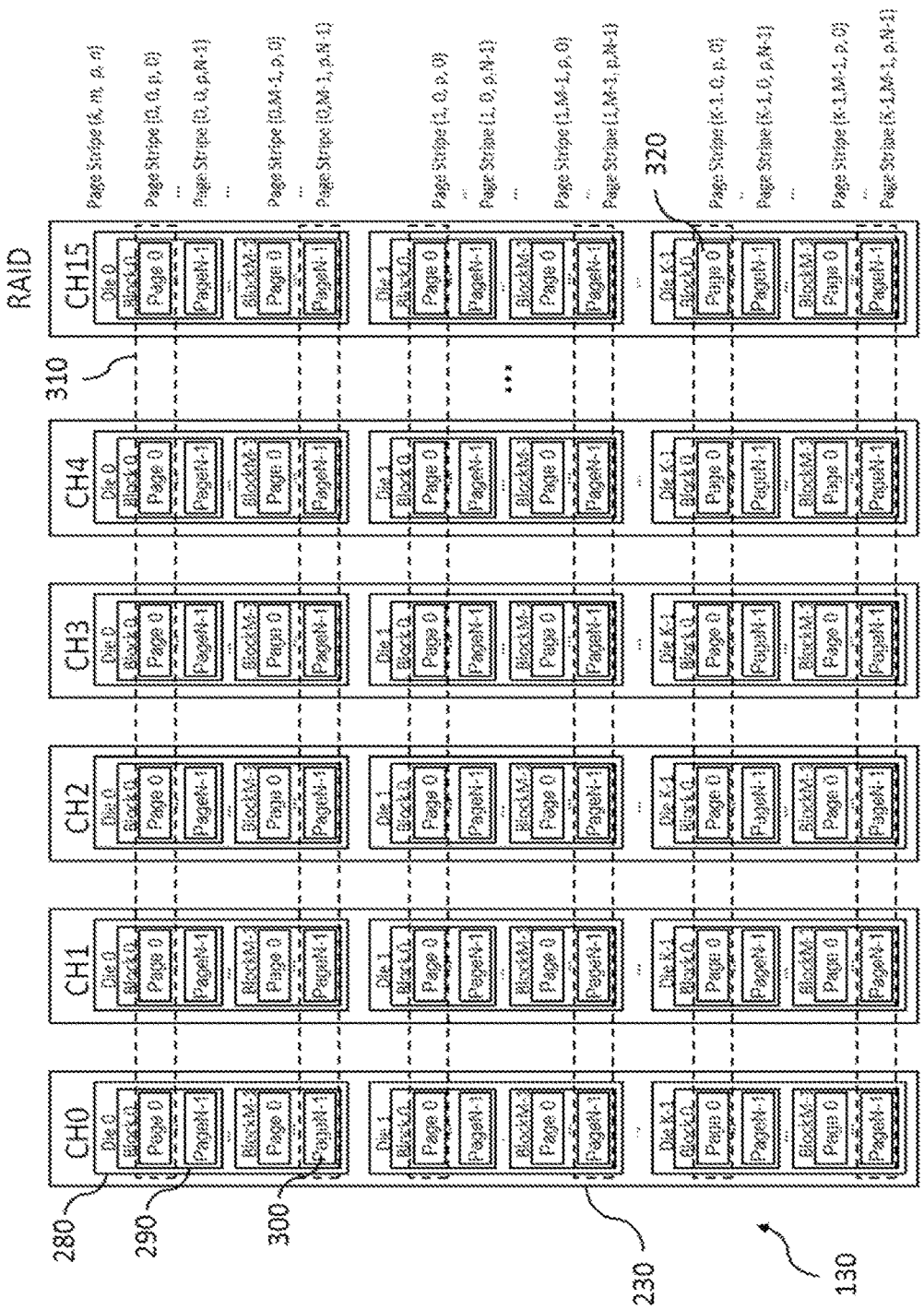
FIG. 4 is a block diagram illustrating the modular array of memory cards utilizing RAID to achieve data redundancy, according to some example embodiments of the present invention.

FIG. 4 is a block diagram illustrating the modular array of memory cards 130 utilizing RAID to achieve data redundancy for user data segment, according to some example embodiments of the present invention. For ease of illustration, FIG. 4 shows 16 channels and memory cards; however, embodiments of the present invention are not limited thereto.

Referring to FIG. 4, under the XOR RAID approach, each page stripe 310 (also referred to as an XOR RAID page stripe) may generate one page of XOR parity 320. In some examples, the parity may be in RAID 4 or RAID 5 mode. As shown, no two pages (e.g., flash pages) may be located in both the same channel and the same XOR RAID page stripe. The parity pages 320 may be concentrated in one memory channel (such as CH 15 as shown in FIG. 4) as RAID 4 or may be distributed in different memory channels as RAID 5. As such, only one page 300 from each page stripe 310 may be lost once a memory card 230 is removed or replaced. The parity overhead, which is 1/CH_NUM, where CH_NUM is the total number of channels (e.g., memory cards 230), may remain the same irrespective of the type (e.g., kind) of RAID (e.g., RAID 4, RAID 5), when the RAID approach is designed to enable the feature of memory channel swap (i.e., memory card 230 swap) in the service field. The parity overhead will be 2/CH_NUM if RAID 6 using Reed-Solomon or 2-Dimensional XOR approach is utilized instead of a regular XOR approach. According to some embodiments, the RAIG (e.g., XOR RAID) is only applied to the user data segment 275, and not the firmware and system segments 260 and 270, as copies of the firmware and system segments 260 and 270 act as their redundancy.

While FIG. 4 illustrates embodiments in which each page stripe 310 includes a single parity page 320, the present invention is not limited thereto. In some embodiments, each page stripe 310 includes two or more parity pages (e.g., as in RAID 6). In such embodiments, three or more copies of the system segment 270 are stored on the memory cards 230 so that the SSD 110 can rebuild the stored data even after the replacement of two memory cards 230.

According to embodiments of the present invention, once a memory channel (i.e., a memory card 230) is replaced with a new one, and the SSD 110 is powered on, the boot-up code of the SSD 110 boots the SSD 110 from the one of the remaining complete copies of the firmware segment 260. Using the SSD system information retrieved from the system segment Firmware 270, the SSD controller 120 then rebuilds the complete data mapping table (e.g., the logical-to-physical/physical-to-logical mapping table) from a complete copy of system segment 270. Thereafter, the missing firmware and system data in the new memory card 230 can be copied back from the remaining complete copies of the firmware and system segments 260 and 270 stored in other ones of the memory cards 230. After retrieval of the firmware and system segments 260 and 270, the SSD controller 120 may recover the lost data of the replaced defunct/failing memory card via the ECC engine 200 and by using the available parity page of each page strip (e.g., by XORing any remaining pages in a page stripe 310 of the user data segment 280).

Because programming data (e.g., NAND flash programming) may be slow (e.g., more than 1 ms for triple-level cell (TLC) programming), according to some embodiments, the page recovery is interleaved among multiple dice 280 so as to increase (e.g., maximize) the programming throughput for the replaced channel. The data recovery pseudo-code may be presented as follows:

```
For (m =0; m<M; m++)
  For (n =0; n<N; n++)
    For (k=0; k<K; k++)
    {
      For (i=0; i<CH_NUM; i++)
      {
        For (p=0; p<P; p++)
        {
          If (i != Replaced_Channel) {
            read back page (i, k, m, p, n);
            XOR the corresponding decoded pages. }
        }
      }
      Write recovered data to pages (Replaced_Channel, k, m, n) in the all
  // (multi-plane programming mode)
    }
``` where M represents the number of memory blocks in each memory die, P represents the number of planes in each memory block, N represents the number of pages in each page, P*N represents the number of pages in each block, K represents the number of dice in each memory channel (e.g., each memory card 230), CH_NUM represents the number of memory channels, page(i, k, m, p, n) refers to a page in channel i, die k, block m, plane p and page n, and Replaced_Channel represents the channel (e.g., defunct memory card 230) that is replaced. In some embodiments, multi-plane programming and interleaving among memory dice are enabled in order to reduce the programming time. In some examples, the above sequence may be changed/segmented in the outer three loops, depending on the NAND flash programming time.

The total rebuild time of the SSD 110 may be dependent on the configuration of the SSD controller 120 and may be limited by ECC decoding resources, as all of the user data is processed by ECC engine 200 (e.g., an ECC decoder) before having an XOR operation performed on them. The rebuild time may also be affected by the number of planes (e.g., flash planes), SSD capacity, number of channels, memory interface speed (e.g., flash memory interface date), data program time, and/or the like.

FIG. 5 is a table tabulating the SSD rebuild time of the SSD 110 using an XOR RAID approach, according to some example embodiments of the present invention.

In the example of FIG. 5, a flash die capacity of 32 GB is assumed for each of the die 280 (of, e.g., the embodiments of and 4), and the throughput of the ECC engine 200 is assumed to be about 4 GB/s. In FIG. 5, some of the rebuild time are limited by the ECC engine throughput and some are limited by the dice number in each flash channel.

After the data rebuild (e.g., XOR rebuild), the SSD 110 returns to normal operational mode. However, according to some embodiments of the present invention, and as shown in FIG. 5, during the rebuild time, the SSD 110 remains functional (e.g., continues to service host data requests), albeit, with degraded performance.

Figure 6:
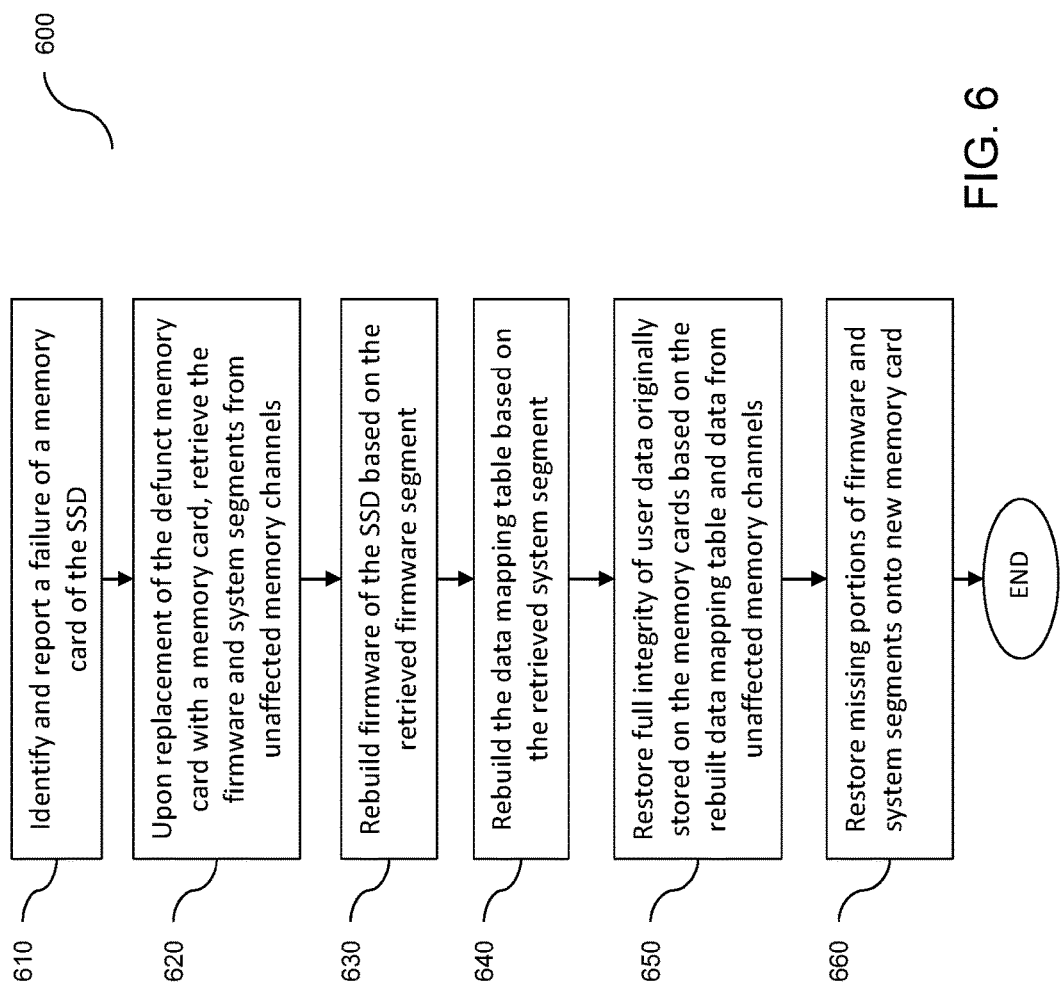
FIG. 6 is a flow diagram illustrating a process 600 of restoring user data in the modular solid-state drive 110, according to some example embodiments of the present invention.

FIG. 6 is a flow diagram illustrating a process 600 of restoring user data in the modular solid-state drive 110, according to some example embodiments of the present invention.

In act 610, the SSD 110 (e.g., the SSD controller 120) identifies the failure of a defunct memory card of the plurality of non-volatile memory cards 230, and reports the identified defunct memory card to a user of the solid-state drive or an automated mechanical system (through a signal or indicator light) to prompt the physical replacement of the defunct memory card with a new non-volatile memory card.

In act 620, upon physical replacement of the defunct memory card with a new non-volatile memory card 230, and a subsequent power on of the SSD 110, and subsequent selection of active firmware/system segment 260/270 where the replaced channel is not located, the SSD controller 120 sets the SSD 110 to recovery mode. Then, the SSD controller 120 retrieves the firmware segment 260 and the system segment 270 from unaffected memory channels of the plurality of memory channels not coupled to the new non-volatile memory card 230. The firmware segment 260 is retrieved from a first subset of the memory channels not coupled to the new non-volatile memory card 230, and the system segment 270 is retrieved from a second subset of the memory channels not coupled to the new non-volatile memory card 230.

In act 630, the SSD controller 120 rebuilds a firmware of the SSD 110 based on the retrieved firmware segment 260, and in act 640, rebuilds the data mapping table (e.g., the logical-to-physical mapping table) associated with the plurality of non-volatile memory cards based on the retrieved system segment 270.

In act 650, the SSD controller 120 restores full integrity of the user data originally stored on the plurality of non-volatile memory cards 230 based on the rebuilt data mapping table and data from the unaffected memory channels. The SSD controller 120 may do so by retrieving unaffected portions of the user data from the unaffected memory channels one page stripe at a time, by processing the unaffected portions of the user data page using the parity data (e.g., by performing, for every page stripe 310 of the user data segment 275, an XOR operation on the pages and parity page of the page stripe), to determine a missing portion of the user data stored on the replaced defunct memory card, and by programming (e.g., writing) the missing portion of the user data to the new non-volatile memory card 230.

In act 660, the SSD controller 120 further copies the retrieved firmware segment onto a first subset of the plurality of memory channels coupled to the new non-volatile memory card 230, and copies the retrieved system segment 270 onto a second subset of the plurality of memory channels coupled to the new non-volatile memory card 230. The first and second subset of channels may overlap by at least one channel, or may not overlap at all.

According to some embodiments, while performing acts 650 and 660, the SSD controller 120 may continue to service host data requests, albeit at a reduced rate.

In some embodiments, the sequence of actions performed by the SSD controller 120 may vary, in a suitable manner, from that presented above. For example, act 660 may be performed prior to act 650 and/or acts 630 and 640 may be performed after acts 650 and 660. Further, the order of performance of acts 630 and 640 may be reversed as well.

In summary, and in view of the above described embodiments, modular design and architectural features of the modular solid-state drive, according to some embodiments of the present invention, facilitate the field reliability and robustness of the solid-state drive. Thus, the modular solid-state drive offers simplified field replacement of a defunct/failing memory card/channel, and automated recovery of the lost information using integrated redundancy. The modular solid-state drive is capable of operating (with degraded operation) during the rebuild time (i.e., the recovery of the lost information), and returns to normal operation after the rebuild process is complete.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on," "connected to," "coupled to," or "adjacent" another element or layer, it can be directly on, connected to, coupled to, or adjacent the other element or layer, or one or more intervening elements or layers may be present. When an element or layer is referred to as being "directly on," "directly connected to," "directly coupled to," or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The modular solid-state drive and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the modular solid-state drive may be formed on one integrated circuit (IC) chip or on separate IC chips. Further, the various components of the modular solid-state drive may be implemented on a flexible printed circuit film, a tape carrier package (TCP), a printed circuit board (PCB), or formed on the same substrate. Further, the various components of the modular solid-state drive may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method of restoring user data in a modular solid-state drive comprising a plurality of memory channels coupled to respective ones of a plurality of non-volatile memory cards, the method comprising:
    upon physical replacement of a defunct memory card of the plurality of non-volatile memory cards with a new non-volatile memory card, and power on of the modular solid-state drive, retrieving a firmware segment and a system segment of the modular solid-state drive from unaffected memory channels of the plurality of memory channels not coupled to the new non-volatile memory card;
    rebuilding a firmware of the modular solid-state drive based on the retrieved firmware segment;
    rebuilding a data mapping table associated with the plurality of non-volatile memory cards based on the retrieved system segment; and
    restoring full integrity of the user data originally stored on the plurality of non-volatile memory cards based on the rebuilt data mapping table and data from the unaffected memory channels.

2. The method of claim 1, further comprising:
    identifying failure of the defunct memory card; and
    reporting the identified defunct memory card to a user of the modular solid-state drive to prompt physical replacement of the defunct memory card with the new non-volatile memory card.

3. The method of claim 1, wherein the retrieving of the firmware segment and the system segment from the memory channels comprises:
    retrieving the firmware segment from a first subset of the memory channels not coupled to the new non-volatile memory card, and
    retrieving the system segment from a second subset of the memory channels not coupled to the new non-volatile memory card.

4. The method of claim 1, wherein the plurality of non-volatile memory cards are configured to store a plurality of copies of the firmware segment and the system segment, wherein each complete copy of the firmware segment only resides at a first subset of the plurality of non-volatile memory cards, and each complete copy of the system segment only resides at a second subset of the plurality of non-volatile memory cards, and wherein the user data is stored as page stripes distributed across the plurality of non-volatile memory cards.

5. The method of claim 1, wherein the plurality of non-volatile memory cards maintain at least a complete copy of the plurality of copies of the firmware and system segments even when the defunct memory card is replaced.

6. The method of claim 1, further comprising:

copying the retrieved firmware segment or only a firmware missing portion of the retrieved firmware segment onto a first subset of the plurality of memory channels coupled to the new non-volatile memory card; and copying the retrieved system segment or only a system missing portion of the retrieved system segment onto a second subset of the plurality of memory channels coupled to the new non-volatile memory card, wherein the firmware missing portion and the system missing portion represent corresponding firmware and system data stored on the replaced defunct memory card.

7. The method of claim 1, wherein the restoring of the full integrity of the user data comprises:

retrieving unaffected portions of the user data from the unaffected memory channels one page stripe at a time;

processing the unaffected portions of the user data comprising a corresponding parity to determine a missing portion of the user data stored on the replaced defunct memory card; and programming the missing portion of the user data to the new non-volatile memory card.

8. The method of claim 1, further comprising:

continuing to service host data requests while restoring the full integrity of the user data originally stored on the plurality of non-volatile memory cards.

9. The method of claim 1, wherein the firmware segment comprises data identifying a configuration of each of the plurality of non-volatile memory cards and utilized for controlling internal operations of the plurality of non-volatile memory cards.

10. The method of claim 1, wherein the system segment comprises a logical-to-physical table mapping logical block addresses of a host to physical memory addresses of the plurality of non-volatile memory cards and a physical-to-logical table mapping physical memory addresses of the plurality of non-volatile memory cards to logical block addresses of a host, and wherein the host is in communication with the modular solid-state drive.

11. The method of claim 1, wherein each of the plurality of non-volatile memory cards comprises a plurality of non-volatile memory dice.

12. The method of claim 1, wherein the plurality of non-volatile memory cards are electrically and mechanically coupled to the plurality of memory channels via a plurality of mating connectors at a controller board of the modular solid-state drive, and wherein the plurality of non-volatile memory cards are configured to be plugged into and unplugged from the plurality of mating connectors.

13. A modular solid-state drive capable of restoring user data after channel failure, the modular solid-state drive comprising:

a plurality of non-volatile memory cards;

a plurality of memory channels coupled to respective ones of the plurality of non-volatile memory cards;

a processor; and a processor memory local to the processor, wherein the processor memory has stored thereon instructions that, when executed by the processor, cause the processor to perform:

upon physical replacement of a defunct memory card of the plurality of non-volatile memory cards with a new non-volatile memory card, and power on of the modular solid-state drive, retrieving a firmware segment and a system segment of the modular solid-state drive from unaffected memory channels of the plurality of memory channels not coupled to the new non-volatile memory card;

rebuilding a firmware of the modular solid-state drive based on the retrieved firmware segment;

rebuilding a data mapping table associated with the plurality of non-volatile memory cards based on the retrieved system segment; and restoring full integrity of the user data originally stored on the plurality of non-volatile memory cards based on the rebuilt data mapping table and data from the unaffected memory channels.

14. The modular solid-state drive of claim 13, wherein the retrieving of the firmware segment and the system segment from the memory channels comprises:

retrieving the firmware segment from a first subset of the memory channels not coupled to the new non-volatile memory card, and retrieving the system segment from a second subset of the memory channels not coupled to the new non-volatile memory card.

15. The modular solid-state drive of claim 13, wherein the plurality of non-volatile memory cards are configured to store a plurality of copies of the firmware segment and the system segment, wherein each complete copy of the firmware segment only resides at a first subset of the plurality of non-volatile memory cards, and each complete copy of the system segment only resides at a second subset of the plurality of non-volatile memory cards, wherein the plurality of non-volatile memory cards maintain at least a complete copy of the plurality of copies of the firmware and system segments even when the defunct memory card is replaced, and wherein the user data is stored as page stripes distributed across the plurality of non-volatile memory cards.

16. The modular solid-state drive of claim 13, wherein the instructions further cause the processor to perform:

copying the retrieved firmware segment onto a first subset of the plurality of memory channels coupled to the new non-volatile memory card; and copying the retrieved system segment onto a second subset of the plurality of memory channels coupled to the new non-volatile memory card, wherein the first and second subset of channels have at least one overlapping channel.

17. The modular solid-state drive of claim 13, wherein the restoring of the full integrity of the user data comprises:

retrieving unaffected portions of the user data from the unaffected memory channels one page stripe at a time;

comparing the unaffected portions of the user data against a corresponding parity to determine a missing portion of the user data stored on the replaced defunct memory card; and programming the missing portion of the user data to the new non-volatile memory card.

18. The modular solid-state drive of claim 13, wherein the firmware segment comprises data identifying a configuration of each of the plurality of non-volatile memory cards and utilized for controlling internal operations of the plurality of non-volatile memory cards.

19. The modular solid-state drive of claim 13, wherein the system segment comprises a logical-to-physical table mapping logical block addresses of a host to physical memory addresses of the plurality of non-volatile memory cards, and wherein the host is in communication with the modular solid-state drive.

20. The modular solid-state drive of claim 13, wherein the plurality of non-volatile memory cards are electrically and mechanically coupled to the plurality of memory channels via a plurality of mating connectors at a controller board of the modular solid-state drive, and wherein the plurality of non-volatile memory cards are configured to be plugged into and unplugged from the plurality of mating connectors.

* * * * *